(No Model.) 3 Sheets—Sheet 1.

J. H. MILBURN.
POISE AND PRICE SCALE ATTACHMENT FOR WEIGHING SCALES.

No. 460,689. Patented Oct. 6, 1891.

WITNESSES
William A. Swett
[signature]

INVENTOR
John H. Milburn
by W E Hagan atty (No Model.) 3 Sheets—Sheet 3.

J. H. MILBURN.
POISE AND PRICE SCALE ATTACHMENT FOR WEIGHING SCALES.

No. 460,689. Patented Oct. 6, 1891.

WITNESSES
William A. Swett
Charles S. Brintnall

INVENTOR
John H. Milburn
by W E Hagan atty

UNITED STATES PATENT OFFICE.

JOHN H. MILBURN, OF SCHUYLERVILLE, NEW YORK.

POISE AND PRICE SCALE ATTACHMENT FOR WEIGHING-SCALES.

SPECIFICATION forming part of Letters Patent No. 460,689, dated October 6, 1891.

Application filed July 23, 1890. Serial No. 359,676. (No model.)

*To all whom it may concern:*

Be it known that I, JOHN H. MILBURN, of Schuylerville, Saratoga county, State of New York, have invented a new and useful Combined Poise and Price Scale-Attachment to Weighing-Scales, of which the following is a specification.

My invention relates to the attachment to weighing-scales of a price-scale, by which the fractions of a pound may be indicated and weighed on the scale-beam through the operation of a sliding price-scale acting as a poise or weight and provided with an indicator to designate that fraction of a pound on the beam which shall be in accordance with the amount of purchase-money and the relative price per pound of the article to be weighed as expressed on the price-scale, the object and purpose of my invention being to prevent mistakes in figuring and to facilitate the work of those operating weighing-scales in retail stores.

Accompanying this specification, to form a part of it, there are three plates of drawings containing five figures, illustrating my invention with the same designation of parts by letter-reference used in all of them.

Figure 1:
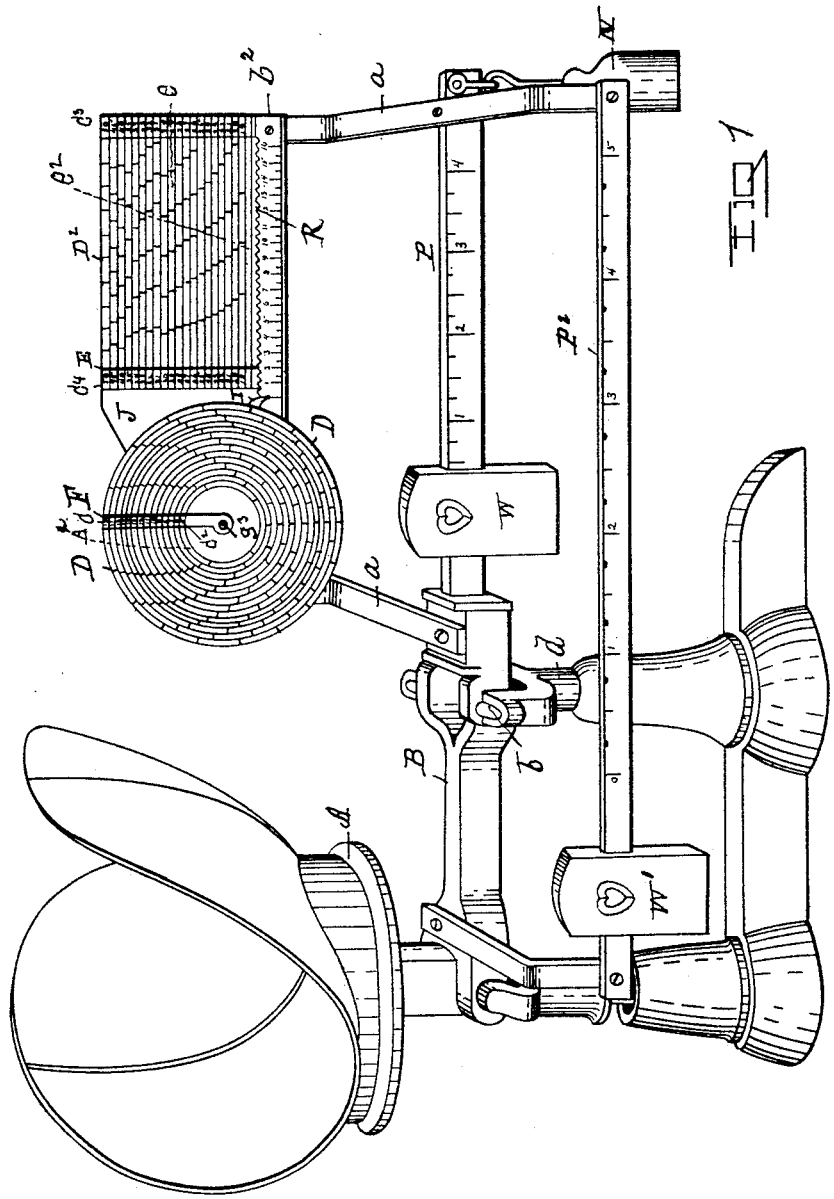
Figure 2:
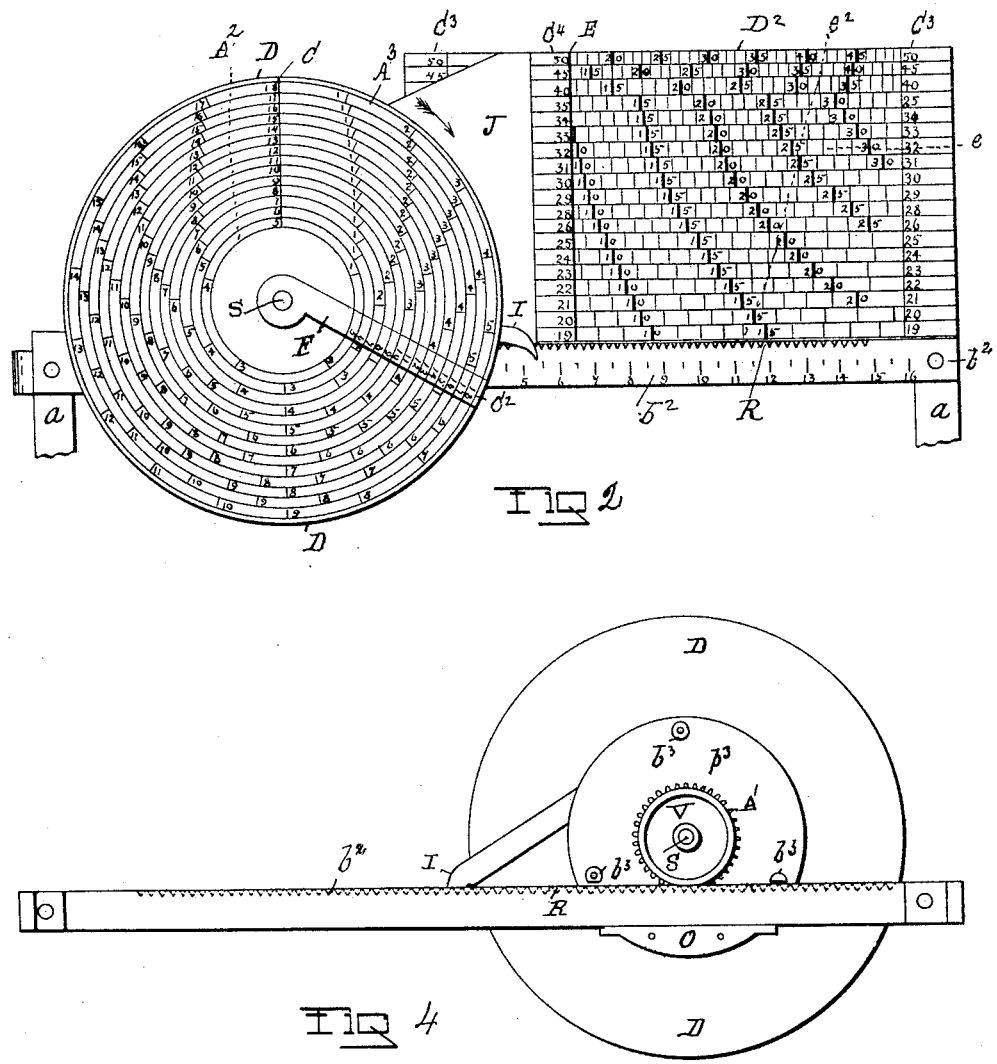
Figure 3:
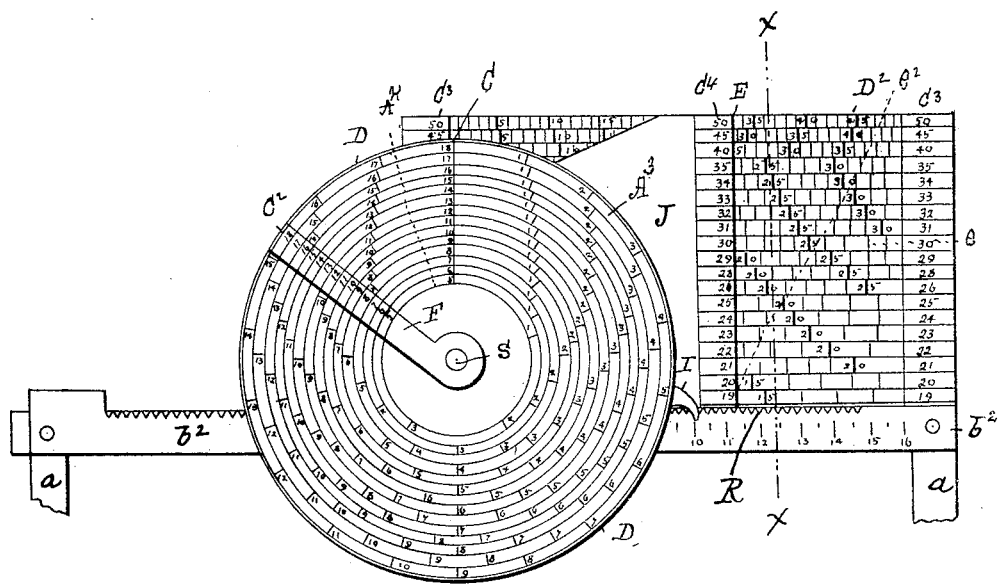
Figure 5:
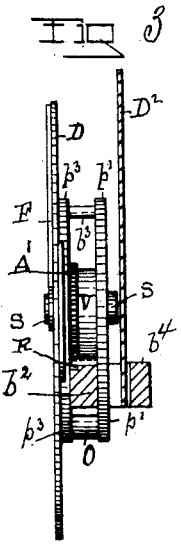

Of these illustrations, Figure 1 is a perspective of a weighing-scale with my invention applied thereto. Fig. 2 is a side elevation of the price-scale and that part of the scale-beam indicating fractions of a pound with the parts illustrated as detached from the other parts of the weighing-scale. Fig. 3 illustrates in a side elevation the same parts that are shown at Fig. 2, but in a different position, relatively to the scale-beam. Fig. 4 shows a back view of the price and poise scale with the rear guide-plate removed, and illustrating also that part of the scale-beam graduated to designate fractions of a pound. Fig. 5 is a section taken on the line $x\,x$ of Fig. 2.

The several parts of the weighing-scale and those containing my invention are designated by letter-reference, and the function of parts is described as follows:

The letter B designates the scale-beam proper, having its fulcrum balanced at $b$, on the stud $d$. The letter P designates a bar arranged on the beam to indicate pounds, and W a poise or weight arranged thereon. The letter P' designates an additional bar that is also connected with the beam proper, which is graduated to weigh pounds and is provided with a poise or weight W'. The letter N designates the balance-poise, which is used in connection with the scale-pan. The letter A designates the weighing-platform arranged on the short arm of the beam proper, and $b^2$ a bar also connected with the beam proper by means of arms $a\,a$, said last-named bar being graduated to designate fractions of a pound, and expressed in ounces and parts of ounces, all of the foregoing being the usual and well-known parts of a weighing-scale, excepting a rack that is shown as produced on the top of the bar $b^2$, the function of which will be described hereinafter.

The letter D designates a disk-form price-scale plate and poise, which is made with a guide-plate $p'$, (see Fig. 5,) arranged at the rear of the disk-form plate D and which is connected to the latter by means of a plate $p^3$, arranged on the back of said plate D, and bolts $b^3$, with said plate $p'$, far enough back of the said plate $p^3$ and disk-form plate D for the intermediate insertion of the ounce-bar $b^2$, and so that the latter will rest on the slide-plate O, arranged between the plates $p'$ and $p^3$ and at the bottom thereof, and by which construction and arrangement the disk-form price-scale plate D may be moved back and forth on the ounce-bar $b^2$. If desired, the plate $p^3$ may be omitted and the plate $p'$ connect by the bolts $b^3$ directly to the plate D.

The letter J designates an alignment-plate, which is connected to the plate $p'$, and from where thus connected is extended toward the outer end of the bar $b^2$.

The letter V designates a drum with its shaft S, having its bearings in the plates $p'$ and $p^3$ and with its shaft also extending through the price-disk plate D, and where thus extending through and in front of the latter it has arranged thereon the finger F.

The letter A' designates a pinion arranged on the said drum, and R a rack made in the top of the ounce-graduated bar $b^2$, adapted to engage with said pinion, so that when the finger F is moved around on the face of the disk-form price-scale D this finger, by means of the pinion A' and its engagement with the rack R on the ounce-bar $b^2$, moves the said disk-form scale D and its connected parts out on the ounce-bar $b^2$ to act as a poise or weight for weighing uses.

The letter I designates a pointer arranged on the disk-form price-plate D, which pointer is slightly in advance of the latter, and where it will, when opposite the graduations of the ounce-bar scale, indicate the amount to be weighed. This disk-form price-scale constructed to thus act as a poise or weight when moved out on the ounce-graduated bar $b^2$ is divided off on its outer face into fourteen annular spaces $A^2$, and these are numbered from the inner annular space to the outer one in numerical order from "5" to "18" and expressed in column at C. Each of these annular spaces is also divided off radially into the same number of spaces $A^3$ as the space is numbered in the column C, as indicated in the outer annular space 18. Thus the annular space indicated at 5 in the column C is divided off radially into five spaces. The annular space indicated at 8 in the column C is divided radially into eight spaces, and these radially-divided spaces are designated in their arrangement numerically. The finger F has upon its exterior face expressed in column, as indicated at $C^2$, a reproduction of the column of figures shown at C on the disk-form price-plate D, and each of the figures in column on the finger is circumferentially in line with the same figure on the disk-form plate D, so that when the finger is moved around on the disk the figures on the finger will be opposite the same annular spaces as are designated in the column C. Thus with the finger F made to radially align with 6 in the eighteen-cent-pound price-space, which is the outer annular space on the disk D and has eighteen radial divisions, the pointer indicates "five and one-third ounces" on the bar $b^2$, as shown at Fig. 2, which will represent six cents' worth of merchandise at eighteen cents per pound, or one-third of a pound.

The disk-form plate D being graduated to indicate parts of a pound up to the pound price of eighteen cents may be made to weigh more by increasing the diameter of the disk; but preferably it is made as shown, and is adapted to operate in connection with a second price-scale $D^2$, which is graduated to have the price-scale designate the weight from nineteen to fifty cents a pound. This scale $D^2$ is attached to the ounce-graduated bar $b'$ back of the alignment-plate J on a bar $b^4$, connecting with the said bar $b^2$, as shown at Fig. 5.

The price-scale $D^2$ is graduated and operated in connection with the price disk-form plate D' as follows: The letters $C^3$ and $C^4$ designate pound-price columns of figures arranged at one or both ends of said scale-plate $D^2$, numbering from nineteen upwardly to fifty, the figures increasing from bottom to top. The alignment-plate J is also numbered in column on its outer edge E, as indicated at $C^4$, with the numbers expressed in column in each corresponding as to quantity, and arranged in horizontal alignment in each of the said columns $C^3$ and $C^4$. The outer face of the front of the pound-price plate $D^2$ is divided off horizontally into spaces corresponding in number to the number of pound-prices expressed in the columns $C^3$ and $C^4$. Each of these horizontal spaces $e$ are divided off into vertical spaces $e^2$, which are numbered in fives so far as they can be as extended toward the beam end. These vertical spaces indicate fractions of the pound-price as stated in the column-figure corresponding to the spaces at the end of the latter.

To operate the apparatus thus arranged the price-scale plate D is moved, as before described, until the edge of the alignment-plate J is coincident vertically at its edge E with the money-value of the pound part to be weighed and as expressed in the horizontal space designated by the pound-price of the article, so that when the mechanism thus moved out on the bar $b^2$ will, as thus stationed, indicate the proper quantity. Thus with butter at forty cents a pound, and a purchaser wanting twenty-five cents' worth, with the disk-plate D and the alignment-plate J moved out on the bar $b^2$ until the edge of the latter aligns vertically with 25 in the forty-cents' space, the indicator will designate ten ounces, as shown at Fig. 3.

Thus made and arranged to operate, the disk-form price-scale D acts as a poise, and its relative position as moved out on the beam indicates the weight of the article as such part of a pound which the given amount of purchase-money will buy at the pound-price of the article as designated on the scale by the radial position of the finger.

It being understood that the beam-bar to which the disk-form price-scale is attached shall balance with the pointer at O, the said price and poise scale D, as constructed to be operated in connection with the beam-bar on which it is placed, may be made larger than shown, so as to include a greater number of pound-prices in connection with a corresponding increased length of the finger F and be used without the price-scale $D^2$, and the latter may also be enlarged, so as to include a greater number of pound-price areas to be used in connection with the disk-form price-scale D.

Having thus described my invention, what I claim, and desire to secure by Letters Patent, is—

1. The combination, with a scale-beam of a disk-form price-scale graduated on its face into annular spaces indicating pound-prices expressed in column, said annular spaces being divided off radially into the same number of spaces as there are units in the pound-price designating each annular space to indicate fractions of a pound-price, substantially as described, of a finger pivotally arranged in the center of said disk-form price-scale and constructed so that when turned around on the face of the latter it will move out said disk-form price-scale on the beam to act as a poise and weigh at the pound-price of each annular space the fractional part of a pound with which the finger is in radial alignment, substantially as shown and described.

2. The combination, with a scale-beam, of a disk-form price-scale having graduated on its outer face a series of annular spaces designated by numbers arranged in column denoting pound-prices, and in numerical order increasing one by one in amount as extending from near the center outward, with each of said annular spaces divided off radially into areas corresponding in number to the number of units expressed in the pound-price column for each annular space and so designated numerically, and a finger turning with a shaft in the center of said disk in front of the latter, said finger being constructed and adapted to move said disk-form price-scale out on the scale-beam to act as a poise thereon to weigh in a measure corresponding to the money-value fraction of a pound as designated at the alignment made by the said finger therewith in the annular space designating the pound-price, substantially as shown and described.

3. The combination, with the scale-beam $B'$, made with the graduated ounce-bar $b^2$, having the rack R, of the disk-form price-scale $D'$, graduated with the designated annular pound-spaces $A^4$, and each of the latter divided off radially and numbered substantially as described, of the finger F, connected to the shaft $S^2$, the drum V, connected to so as to turn with said shaft, the pinion $A^3$, arranged on so as to turn with said drum, and the plate $p^2$, made with the slide O and connected to said disk-form plate back of the latter, constructed and arranged to operate substantially in the manner and for the purposes set forth.

4. The combination, with the scale-beam $B'$, made with the ounce-graduated bar $b^2$, having the rack R, of the disk-form price-scale $D'$, made with the pointer I and graduated to designate the annular pound-price spaces $A^4$, divided off radially and numbered, substantially as described, the finger F, connected to the shaft $S^2$, the drum V, connected to so as to turn with said shaft, the pinion $A^3$, arranged on said drum to turn therewith, and the plate $p^2$, made with the slide O and connected to said disk-form price-plate back of the latter, constructed and arranged to operate substantially in the manner as and for the purposes set forth.

5. The combination, with a scale-beam and the bar attached thereto and at the rear thereof, of a price-scale plate that is graduated on its outer face in horizontally-divided spaces, each of which is vertically divided off and numbered to designate the fractions of a pound-price, and each of the pound-price spaces designated by figures in column where opposite, said figures in column increasing from the bottom upward, and an alignment-plate having a straight vertical edge and operated to be moved out on said beam and to act as a poise where in vertical alignment with each one of the fractional pound-price parts, as indicated by the pound-price in column, substantially in the manner as and for the purposes set forth.

6. The combination, with the scale-beam $B'$, made with the ounce-bar $b^2$, of the price-scale plate $D^2$, graduated on its outer face in horizontal spaces representing the fractions of the pound-prices expressed in column, with the latter increasing numerically from the bottom to the top of the plate, said price-scale plate being attached to and back of said ounce-bar, and the disk-form price-scale plate $D'$, made with the alignment-plate J, constructed and arranged to move with the latter out in front of the plate $D^2$ on the beam and to act as a poise to weigh such fractional values of a pound as are expressed in each of the pound-price spaces and with which the edge of the said plate J is in vertical alignment, substantially in the manner as and for the purposes set forth.

Signed at Troy, New York, this 17th day of March, 1890, and in the presence of the two witnesses whose names are hereunto written.

JOHN H. MILBURN.

Witnesses:
CHARLES S. BRINTNALL,
W. E. HAGAN.